United States Patent [19]

[11] 3,950,371

Jeromin et al.

[45] Apr. 13, 1976

[54] METHOD OF SEPARATING MIXTURES OF FATTY SUBSTANCES

[75] Inventors: Lutz Jeromin, Dusseldorf; Norbert Bremus, Langenfeld Rhineland; Georg Friederici, Dusseldorf; Peter Peiffer, Krefeld, all of Germany

[73] Assignee: Henkel & Cie G.m.b.H., Dusseldorf, Germany

[22] Filed: Apr. 8, 1974

[21] Appl. No.: 458,684

[30] Foreign Application Priority Data

Apr. 7, 1973 Germany ............................ 2317563

[52] U.S. Cl. .................... 260/419; 62/58; 260/420; 260/428; 260/643 A; 260/707

[51] Int. Cl.$^2$.... C11C 1/08; C11B 3/00; B01D 9/00

[58] Field of Search..................... 260/419, 420, 428

[56] References Cited

UNITED STATES PATENTS 3,884,046 5/1975 Schmidt et al. ......................... 62/58

*Primary Examiner*—Winston A. Douglas
*Assistant Examiner*—P. E. Konopka
*Attorney, Agent, or Firm*—Hammond & Littell

[57] ABSTRACT

A method for separating fatty substance mixtures into components of different melting points by the "Rewetting or Hydrophilization Process," with the heat removal necessary for cooling and crystallizing higher melting fatty substance fractions being obtained essentially by vacuum evaporation of an aqueous, non-surface-active electrolyte solution in direct contact with the fatty substance mixture.

9 Claims, No Drawings

METHOD OF SEPARATING MIXTURES OF FATTY SUBSTANCES

THE PRIOR ART

The separation of fatty acid mixtures or of fatty acid ester mixtures into components of different melting points by a wetting agent process is known from U.S. Pat. No. 2,800,493, July 23, 1957, Stein et al. This process has become known as the "Rewetting or Hydrophilization Process." According to this patent, a mixture of solid and oily fatty substance particles is transformed by means of a wetting agent solution, optionally containing non-surface-active electrolyte, into a dispersion of separate solid and oily fatty substance particles. This dispersion is separated by means of solid jacket centrifuges into an oily phase and an aqueous phase containing the solid fatty substance particles in dispersion. The heat removal necessary for the crystallization of the solid fatty substance particles is obtained by cooling devices, in particular scraping condensers. After termination of the separating process, the recovered wetting agent solution is recycled. German Pat. No. 1,010,062, or U.S. Pat. No. 2,972,636, Stein et al, describes a corresponding process for the separation of fatty alcohols.

The essential disadvantages of the above mentioned processes are the high investment and operating costs for cooling equipment and cooling devices. In particular the required scraping condensers are costly and require continual servicing.

From U.S. Pat. No. 3,541,122 a method is further known for the separation of mixtures of fat-like materials into fractions of different melting points, which is also carried out by the rewetting process. Here, however, the cooling of the molten fatty substance mixture required for crystallization is obtained by vacuum evaporation of water. After completion dispersion of the fatty substance mixture consisting of liquid and solid particles in a wetting agent solution, the crystallized solid phase is separated by filtration, and the oily dispersion passes through the filter. In this procedure the separation of the oily fraction and the solid particles is not complete, so that the latter have a relatively high iodine number and hence a comparatively poor quality.

Published German Patent Application (DOS) No. 1,915,298, discloses a method of separating fatty acid, fatty alcohol, or fatty acid ester mixtures into components of different melting points by mixing the molten mixture with an aqueous wetting agent solution. The crystallization of the solid fractions to be separated is obtained by evaporating a part of the aqueous wetting agent solution under reduced pressure. Because the fatty substances used can be degased only with difficulty and incompletely on being fed into the crystallizer vessel, intense foaming takes place upon addition of the wetting agent solution, whereby the progress of the process is greatly disturbed. Moreover, the wetting agent hinders crystal growth, which in turn leads to difficulties in the further separation of oily and solid phase.

OBJECTS OF THE INVENTION

It is an object of the present invention, in carrying out the rewetting process to avoid the high investment costs for the installation and servicing of refrigeration equipment and cooling devices, in particular scraping condensers, and, furthermore, to improve the effectiveness of the separation method and hence to improve the quality of the products obtained.

It is another object of the present invention to provide a method of separating fatty substance mixtures into components of different melting points by the rewetting process, with the heat removal necessary for cooling and crystallizing higher melting fatty substance fractions being obtained essentially by vacuum evaporation of an aqueous, non-surface-active electrolyte solution in direct contact with the fatty substance mixture.

These and further objects of the present invention will become apparent as the description thereof proceeds.

DESCRIPTION OF THE INVENTION

The present invention relates to a method of separating fatty substance mixtures into components of different melting points.

Generally speaking, the present invention concerns a method of separating fatty substance mixtures into components of different melting points by the rewetting process, with the heat removal necessary for cooling and crystallizing higher melting fatty substance fractions being obtained essentially by vacuum evaporation of an aqueous, non-surface-active electrolyte solution in direct contact with the fatty substance mixture.

More particularly, the present invention provides a method of separating fatty substance mixtures into components of different melting points by the rewetting process, where the heat removal required for the cooling and crystallization of higher melting fatty substance fractions is obtained by vacuum evaporation of an aqueous phase in direct contact with the fatty substance mixture, characterized by the following steps:

a. partial or complete melting of the fatty substance mixture;

b. addition of an aqueous non-surface-active electrolyte solution to the molten fatty substance mixture and evaporation of a part of the water of the electrolyte solution by means of a vacuum simultaneously with intensive mixing to produce partial or complete crystallization of the higher melting fraction;

c. addition of wetting agent solution with dispersing of the liquid and solid fatty substance therein, preferably while maintaining the vacuum and continuing the water evaporation until the separation temperature is reached;

d. separation of the dispersion by means of centrifuge into an oily phase containing the lower melting fatty substance fractions, and an aqueous phase containing the crystallized fatty substance fractions in dispersed form;

e. separation of the higher melting fatty substance fractions from the aqueous phase by filtration or by melting and subsequent separation of oily from aqueous phase by centrifuging or allowing to settle.

The present invention is preferrably directed to an improvement in the method for the separation of mixtures of fatty substances into components of different melting points by the rewetting process which comprises the steps of (a) at least partial melting of a fatty substance mixture, (b) cooling and crystallizing said fatty substance mixture into a mixture of liquid and solid particles, (c) dispersing said mixture of liquid and solid particles in an aqueous wetting agent solution containing electrolyte at a temperature whereby a dispersion of liquid and solid fatty substance is obtained, (d) separation said dispersion into a lighter phase consisting substantially of the liquid, lower-melting fatty substance fractions and a heavier phase consisting substantially of solid, higher-melting fatty substance fractions dispersed in said aqueous wetting agent solution, (e) separating the solid higher-melting fatty substance fractions from said aqueous wetting agent solution, and (f) recovering said separated fatty components of different melting points; the improvement which comprises in step (b) adding an aqueous non-surface-active electrolyte solution to said at least partially melted fatty substance mixture and cooling to substantially the separation temperature by evaporation under vacuum of a part of the water of said aqueous electrolyte solution with simultaneously intensely mixing said at least partially melted fatty substance mixture and said aqueous electrolyte solution.

In addition the invention comprises the further improvement of optionally adding a part or all of the said aqueous wetting agent solution while maintaining the vacuum and continuing the water evaporation until the desired separation temperature is reached.

In a preferred embodiment of the process, the aqueous electrolyte containing wetting agent solution is recycled entirely or partially.

The method is suitable for the separation of a variety of fatty substance mixtures; in particular, mixtures of fatty acids, fatty acid esters or fatty alcohols can be separated when the melting points of the components to be separated are sufficiently far apart.

Of particular technical importance is the separation of fatty acid mixtures into technical olein and technical stearin (oleic and stearic acids), or of fatty alcohol mixtures into oleyl alcohol and stearyl alcohol. Correspondingly, solid mixtures of fatty acid triglycerides can be separated at room temperature into lower and higher melting fractions. Such fatty acid triglyceride fractions are used for the production of edible fats. It is not necessary that one of the components to be separated is present as a liquid oil at room temperature. The method can also be successfully utilized when both fractions are solid at room temperature and merely differ sufficiently in their melting points.

The process of the present invention is carried out in the following manner:

a. The fatty substance mixture to be separated is wholly or partially melted in a suitable heatable vessel, for example, in a melting device equipped with a stirrer, so that the temperature of the mixture is above the anticipated separation temperature. Alternatively the procedure may be to precool a fully molten mixture in a conventional manner, for example, in a heat exchanger, so that a partial elimination of the fatty fraction to be separated has already occurred. It is generally desirable for technical reasons to avoid a partial crystallization in this stage and to select the temperature somewhat above the starting crystallization temperature.

b. The further cooling of the partially or completely molten fatty substance mixture is achieved by vacuum evaporation cooling. The process may be conducted by batches or continuously. The vaporizable liquid utilized is preferably an aqueous non-surface-active electrolyte solution. Preferably this is a makeup solution where a continuous process is employed with a discharge of part of the cycling aqueous solution. This solution is brought into contact with the fatty substance mixture under vacuum and is simultaneously mixed intensively. This mixture is maintained under reduced pressure with continual evacuation of the water vapor formed until a viscous crystal paste has been formed, by crystallization of solid fatty substance from the fatty substance mixture which can hardly be handled by the mixer. The temperature reached at this point is termed the temperature limit of incipient crystallization. At this stage the evaporation of water is greatly hindered due to insufficient mixing, so that the cooling rate decreases considerably and continuation of the process would become uneconomical.

When working by batches, the pressure in the mixing vessel is reduced by means of a suitable evacuating system. Above the liquid, the vapor pressure of water adjusts itself to the respective temperature so that the cooling takes place without temperature discontinuities in the metastable range of crystallization along the vapor pressure curve of water. In this temperature range spontaneous seed formation is largely avoided; and relatively large crystals are formed which are capable of good separation from the oily phase.

The addition of electrolyte solution occurs either intermittently or continuously after evacuation of the vessel. The electrolyte solution may be introduced below the surface of the fatty substance mixture, possibly in finely divided form, whereby intensive mixing takes place simultaneously.

For continuous operation it is preferred to work with a cascade vessel equipped with a stirrer. The fatty substance mixture and electrolyte solution are fed into the first stirrer equipped vessel of the cascade apparatus and then pumped from one stage to the next. In the downstream flow direction of the product stream, the pressure and hence the temperature decreases by discontinuous steps from vessel to vessel according to the vapor pressure of the water. The temperature steps must be made very small, and hence the number of mixing vessels of the cascade apparatus must be made so large that the continuous process will come as close as possible to the "ideal crystallization" along the vapor pressure curve of water, attainable in batch operation. This is because in the batch process the crystallization occurs in the metastable range and spontaneous seed formation is avoided.

The quantity of heat to be removed by evaporation depends on the heat capacity of the batch, upon the desired temperature decrease, and upon the heat of crystallization obtained. The amount of electrolyte solution added to the fatty substance mixture in partially to completely molten form is such that the necessary temperature reduction is obtained and that upon reaching the temperature limit of incipient crystallization a just barely stirrable and pumpable crystal plate is present. As a rule, however, as much electrolyte solution is added as water and wetting agent solution is removed during the cycle. The quantity of wetting agent solution to be eliminated from the cycle depends largely on the purity of the fatty substances and is necessary for the removal of slime and dirt substances from the process, which would influence the crystallization and, if not removed, would cause progressively higher iodine numbers in the components of the fatty substances that are solid at the separation temperature.

The temperature of the electrolyte solution when added should be approximately equal to that of the fatty substance mixture batch.

The aqueous non-surface-active electrolyte solution used in the process contains about 0.1% to 10% by weight, preferably from 0.5% to 2% by weight of a water-soluble salt for example a chloride, sulfate or nitrate of a mono-di- or tri-valent metal, such as a salt of an alkali metal, an alkaline earth metal, or an earth metal. Salts such as sodium sulfate, magnesium sulfate or aluminum sulfate have proved particularly successful as agents in forming the electrolyte solution. The total quantity of electrolyte to be added depends upon the proportion of electrolyte containing wetting agent solution removed from the cycle at the end of the separating process.

c. After the desired temperature has been reached, the vacuum may be broken; and the quantity of wetting agent solution necessary for dispersing the liquid and solid fatty substance is added. With intense mixing the rewetting process begins. The oily fractions of the fatty substance mixture are displaced from the surfaces of the crystallized or solid fractions.

In a preferred embodiment of the process, a portion of the wetting agent solution is introduced before the desired separation temperature is reached. This is done appropriately as soon as the temperature limit of incipient crystallization is reached; and the addition of wetting agent causes the crystal paste to liquefy again. The vacuum is then maintained, such that the process of evaporation and cooling can now proceed until the anticipated separation temperature is reached. At the same time the rewetting process takes place, and a highly fluid dispersion is formed which contains both the oily as well as the crystallized fatty substance fractions as separate particles in dispersion.

The wetting agent solution utilized is essentially the so-called "old diluted" wetting agnt solution recycled from the process. If necessary, fresh wetting agent is added to the "old diluted" solution as replacement for the wetting agent fraction lost in separation or discharged. Difficulties due to foaming do not occur even when operating according to the preferred process embodiment; that is when the wetting agent solution is introduced into the vessel while still under vacuum. This is preferably done by feeding in (flashing in) above the liquid surface, due to which extensive degassing and removal of the dissolved air, occurs before the mixture of fatty substance and electrolyte solution is stirred in. The fatty substances used are degased anyway by the preceding vacuum evaporation cooling. The water vapor evolved during the continued evaporation cooling forms relatively closely below the surface of the liquid; and the distance it travels while rising is very short, so that no foaming occurs.

To obtain a separable dispersion, the proportion of aqueous phase at the end of the evaporation cooling step should be from 0.3 to 5 times, preferably from 0.7 to 3 times, the fatty substance mixture charged. The losses due to discharging a part of the wetting agent solution, the so-called "old diluted" solution, from the process cycle are replaced expediently after the vacuum has been broken by a corresponding amount of electrolyte solution for incipient crystallization and of fresh wetting agent.

Examples of wetting agents include anionic or nonionic water-soluble compounds, which lower the surface tension of the aqueous solution and thus bring about a displacement of the oily components of the starting mixture from the surface of the crystallized or solid fractions. The surface-active compounds disclosed in U.S. Pat. No. 2,800,493 can be used as wetting agents in particular, compounds with alkyl radicals having 8 to 18 carbon atoms, preferably 10 to 16 carbon atoms in the molecule. Examples of suitable anionic surface-active compounds include soaps; sulfonates such as alkylbenzene sulfonates having 8 to 18 carbon atoms in the alkyl, and alkyl sulfonates having 8 to 18 carbon atoms; sulfates such as fatty alcohol sulfates having 8 to 18 carbon atoms, sulfatized reaction products of fatty alcohols having 8 to 18 carbon atoms, adducted with 1 to 10, preferably 2 to 5 mols of ethylene oxide and/or propylene oxide, and fatty acid monoglyceride sulfates having 8 to 18 carbon atoms in the fatty acid moiety, etc. These anionic surface-active compounds are used in the form of their alkali metal salts, preferably as the sodium salt, but other suitable salts include the potassium salt, ammonium salt, the mono-, di- or tri-lower alkanolamine salts such as the triethanolamine salt. Examples of non-ionic surface-active compounds include the water-soluble products of addition of ethylene oxide and/or propylene oxide to alkyl phenols having 8 to 18 carbon atoms in the alkyl or to fatty alcohols having 8 to 18 carbon atoms. The fatty substance dispersion should contain from 0.05 to 2, preferably 0.1 to 1, parts by weight of wetting agent per 100 parts by weight of solution. This amount of wetting agent includes not only the amount of wetting agent dissolved in the aqueous phase, but also that dissolved in the oil or adsorbed on the surface of the solid fractions.

d. After completion of the cooling and breaking of the vacuum, the dispersion of the fatty substance fractions is separated by means of centrifuges, such as full jacket centrifuges or separators, into an oily phase containing the lower melting fatty substance fractions, and into an aqueous phase containing the crystallized or solid fatty substance fractions in dispersed form. For this process various centrifuge types are suitable, for example tube centrifuges, dish centrifuges or scoop tube centrifuges. Especially preferred are the latter type, in which the phases are removed from the centrifuge by scoop tubes.

After passing through the centrifuge, the oily fatty substance fractions are recovered, possibly after having been washed and dried. If necessary, another separation step may be employed at a lower temperature, such that an oil of correspondingly lower cloud point will be obtained.

e. The suspension of crystallized fatty substance fractions issuing from the centrifuge is separated by heating the suspension. The crystallized fatty substance fractions melt, and subsequently centrifuging or settling takes place, for example in settling tanks. Another possibility is to filter the crystallized fatty substance fractions. After passing through the separating process once, the higher melting fraction of the fatty substance mixture thus obtained has a very high purity.

The recovered wetting agent solution is recycled as socalled "old dilution." From 30% to 90% by weight is recovered and recycled, and preferably from 60% to 90%, and especially 70%, is recovered and recycled. It is, however, necessary to remove a part of this solution from the cycle continuously to avoid the accumulation of slime impurities or non-fatty substance organic impurities from the fatty substances charged, which could impair the crystallization and also the quality of the higher melting fatty substance fraction. The resulting loss of wetting agent solution must be compensated by adding fresh wetting agent solution. The simultaneously occurring electrolyte loss is replaced by the electrolyte solution supplied during evaporation cooling, and in particular, during incipient crystallization. Further the process must be controlled so that the losses of water occurring during evaporation cooling, or due to removal of wetting agent solution, are compensated by the electrolyte solution or fresh wetting agent solution supplied. Some discussion of these procedures is to be found in U.S. Pat. No. 3,737,444, June 5, 1973, Hartmann et al.

The procedure according to the invention has special advantages over the known process. On the one hand, operating in the metastable range of crystallization and in the presence of electrolyte solution brings about the formation of particularly large crystals which permit a very neat separation of the oily fatty substance fraction. Compared with the method described in U.S. Pat. No. 3,541,122 (incipient crystallization in water) and with the mode of operation set forth in German Offenlegungsschrift No. 1,915,298 (incipient crystallization in wetting agent solution), it is possible to obtain a purer and hence more valuable, crystallized fatty substance by utilizing the new process involving incipient crystallization in the presence of electrolyte solution. For example it is possible to obtain from tallow fatty acids, a purer and more valuable, crystallized fatty substance, stearin or technical stearic acid. At the same time, the yield of the oily fatty substance phase, the olein or technical oleic acid, is thereby increased.

On the other hand, the foaming problems occurring in the known process of evaporation cooling in the presence of wetting agents are avoided, since in the presence of electrolyte solution, a complete degasing of the fatty substance mixture readily takes place during the evaporation cooling. A special pretreatment of the fatty substance mixture or, respectively, a preceding additional separative process step is thus unnecessary with the continuous mode of operation. On the other hand, the process of the invention is particularly favorable also from the aspect of instrumentation, inasmuch as special cooling devices, such as refrigeration machines, scraping condensers and the like, become superfluous. Naturally, however, a combination of the conventional cooling method with the described new method is conceivable, but as a rule such combinations are not important because they lack economic efficiency.

The following examples are merely illustrative of the present invention without being deemed limitative in any manner thereof.

EXAMPLE 1

Separation of a Fatty Acid Mixture

Into a vacuum vaporization crystallizer (mixing vessel of a useful volume of 2 $m^3$) were charged 500 liters of a liquid undistilled fatty acid hydrolyzed from beef tallow (Tallow A -hydrolyzed fatty acids) of iodine number 60, together with 350 liters of electrolyte solution (2% magnesium sulfate solution) heated to a temperature of 50°C. The vessel was evacuated by means of a steam jet system.

Evaporation of the water caused the liquid contained in the vaporizer to cool. On falling below the crystallization temperature (38°C) of the hydrolyzed fatty acids, stearic acid crystallized. At 33°C further crystallization of the fatty acids in the presence of pure electrolyte solution was stopped because at this temperature a viscous crystal paste had already formed, which could hardly be further stirred.

During further cooling from 33°C to 20°C, 490 liters of "old diluted" wetting agent solution from the cycle were added continuously together with 5 liters of fresh wetting agent solution. The fresh solution contained 5 gm/liter wetting agent ($C_{12}$-fatty alcohol sulfate) and 10 gm/liter magnesium sulfate.

Since the water evaporation and hence the cooling was continued, an additional amount of the stearic acid fraction crystallized, and relatively thinly liquid suspension was formed — due to the process of wetting. Upon reaching the separation temperature of 20°C, the vacuum was broken and the suspension was separated in a scoop tube centrifuge into an oleic acid fraction phase and a stearic acid fraction-water phase. The stearic acid fraction-water phase was heated in a heat exchanger to about 70°C, the stearic acid crystals being melted. In a settling tank separator the stearic acid fraction was finally separated from the old diluted solution by settling.

The separated products of the above separation procedure had the following characteristics:

| | |
|---|---|
| Iodine number of stearic acid fraction: | 14 to 15 |
| Iodine number of oleic acid fraction: | 85 to 87 |
| Cloud point of oleic acid fraction: | 14°C to 15°C |

EXAMPLE 2

Separation of a Triglyceride Mixture

In a vacuum evaporation crystallizer (mixing vessel of a useful volume of 2 $m^3$) were partially crystallized according to the procedure of Example 1 above, 500 liters of crude palm kernel fat (iodine number 15.2, acid number 17.5, saponification number 250) in the presence of 180 liters of electrolyte solution (3% sodium sulfate solution), until a temperature of 24°C was reached. (This is the temperature limit for incipient crystallization). Evaporation cooling proved particularly advantageous here since no supercooling phenomena wer observed, when readily occur according to the conventional procedure (cooling in the scraping condenser), leading to disturbances of the crystallization process.

After reaching the above mentioned temperature limit, 560 liters of an aqueous wetting agent solution containing 0.8% by weight of sodium fatty alcohol sulfate and 3% by weight of sodium sulfate were charged under vacuum, until a dilution ratio (fat fractions: aqueous phase) of 1:1.35 was reached. Under intense mixing the wetting process occurred with formation of a relatively thinly liquid suspension.

Upon continued water evaporation, cooling was continued to the separating temperature of 22°C, and after breaking of the vacuum the suspension obtained was separated in a scoop tube centrifuge into an oil phase and an aqueous suspension of the crystallized fractions. The solid fatty substance fractions were obtained as in Example 1 by melting and then settling.

The separated products had the following characteristics:

For the oily phase: Iodine number 21.3; acid number 12.6; saponfication number 240

For the solid phase: Iodine number 5.0; acid number 6.1; saponification number 265.

EXAMPLE 3

Separation of a Fatty Alcohol Mixture

In a 2 $m^3$ vacuum mixing vessel, 500 liters of a fatty alcohol mixture derived from tallow fatty acids (iodine number 57.3) were partially crystallized in the presence of 200 liters of electrolyte solution (6% $M_2SO_4$), up to a temperature of 22°C. The resulting pasty dispersion was further cooled to the separating temperature of 18°C analogously to Example 2 above, with the addition of 540 liters of a wetting agent solution consisting of a 6% electrolyte solution (having added 15 gm of magnesium sulfate per liter of solution) and 0.55% wetting agent (having added 6 gm of dodecylbenzyl-diethyl ammonium chloride per liter of solution). The thin liquid dispersion thus produced was separated in a scoop tube centrifuge. The separated products have the following characteristics:

Oleyl alcohol fraction: Iodine number: 85.6

Stearyl alcohol fraction: Iodine number: 12.6

EXAMPLE 4

Continuous Separation of Animal Fatty Acids

In a three stage vacuum mixing vessel cascade, undistilled beef tallow fatty acid (Iodine number 58.0) was partially crystallized in two stages in the presence of a 2% electrolyte solution (20 gm of magnesium sulfate per liter of solution) according to Table I:

TABLE I

| | Useful volume $m^3$ | Pressure Torr | Temp. °C | Fatty acid liter/h | Electrolyte liter/h | "Old Diluted" liter/h |
|---|---|---|---|---|---|---|
| *Stage 1 | 1.6 | 42.16 | 35 | 300 | 185 | 0 |
| Stage 2 | 2 | 28.34 | 28 | — | — | 0 |
| **Stage 3 | 2 | 17.52 | 20 | — | — | 315 |

*Incipient crystallization
**Cooling and dilution

The viscous crystal paste was pumped from the first stage to the second stage and from the second stage to the third stage using eccentric screw pumps.

Corresponding to a quantity of "old diluted" solution of 30%, discharged from the cycle, 70% of the "old diluted" solution obtained in the cycle were returned to the third stage, previously mixed with fresh wetting agent, giving a total quantity of 315 liters/h of wetting agent containing solution. The latter contained 5 gm of $C_{12}$-fatty alcohol sulfate per liter of solution. The amount of water evaporated in the three crystallizers and the 30% amount of water of "old diluted" solution to be replaced was added as electrolyte solution to the first stage. The highly fluid dispersion of the third stage (ratio fatty acid: aqueous phase = 1:1.5) was separated in a scoop tube centrifuge. According to Example 1, the stearic acid fraction-water phase was heated in a heat exchanger to about 70°C, thus melting the stearin crystals, and then separated in a settling tank separator.

The separated products had the following characteristics:

| | |
|---|---|
| Iodine number of stearic acid fraction: | 15 to 16 |
| Iodine number of oleic acid fraction: | 85 to 87 |
| Cloud point of oleic acid fraction: | 14°C to 15°C |

Although the present invention has been disclosed in connection with a few preferred embodiments thereof, variations and modifications may be resorted to by those skilled in the art without departing from the principles of the new invention. All of these variations and modifications are considered to be within the true spirit and scope of the present invention as disclosed in the foregoing description and defined by the appended claims.

We claim:

1. In the method for separation of mixtures of fatty acids into components of different melting points by the rewetting process which comprises the steps of (a) at least partial melting a fatty acid mixture, (b) cooling and crystallizing said fatty acid mixture into a mixture of liquid and solid particles, (c) dispersing said mixture of liquid and solid particles in an aqueous wetting agent solution, having a wetting agent selected from the group consisting of an anionic surface-active compound and a nonionic surface-active compound, containing electrolyte at a temperature whereby a dispersion of liquid and solid fatty acids is obtained, (d) separating said dispersion into a lighter phase consisting substantially of the liquid lower-melting fatty acid fractions and a heavier phase consisting substantially of solid, higher melting fatty acid fractions dispersed in said aqueous wetting agent solution, (e) separating the solid higher-melting fatty acid fractions from said aqueous wetting agent solution, and (f) recovering said separated fatty acids of different melting points, the improvement which consists essentially in step (b) of adding an aqueous non-surface-active electrolyte solution containing from 0.1% to 10% by weight of a water-soluble salt selected from the group consisting of a chloride, a sulfate and a nitrate of a metal selected from the group consisting of a monovalent metal, a divalent metal and a trivalent metal, to said at least partially melted fatty acid mixture and cooling to the temperature of incipient crystallization by evaporation under vacuum of a part of the water of said aqueous electrolyte solution with simultaneously intensely mixing said at least partially melted fatty acid mixture and said aqueous electrolyte solution, whereby the amount of aqueous phase at the end of the evaporation cooling of step (b) is from 0.3 to 5 times the weight of the fatty acid mixture charged.

2. The method of claim 1, wherein, after partial evaporation of part of said water under vacuum, said wetting agent solution containing electrolyte is added during step (b) while maintaining said vacuum and continuing said water evaporation until the desired separation temperature is reached.

3. The method of claim 1, wherein in step (b) the crystallization is carried out in the metastable range of crystal formation along the vapor pressure curve of water.

4. The method of claim 1, which is a batch process.

5. The method of claim 1, which is a continuous process.

6. The method of claim 2, wherein in step (b) said wetting agent solution is added when the temperature has been cooled to the temperature limit of incipient crystallization, and after adding said solution cooling is continued by means of evaporation until substantially the separation temperature is reached.

7. The method of claim 1, in which said electrolyte solution contains from 0.5% to 2% by weight of said water-soluble salt.

8. The method of claim 1, in which said water-soluble salt contained in said electrolyte solution is selected from the group consisting of sodium sulfate, magnesium sulfate and aluminum sulfate.

9. The method of claim 1, in which the amount of aqueous phase at the end of the evaporation cooling of step (b) is from 0.7 to 3 times the weight of said fatty acid mixture.

* * * * *